(12) United States Patent
Rösel et al.

(10) Patent No.: US 6,571,550 B2
(45) Date of Patent: Jun. 3, 2003

(54) METHOD FOR ADJUSTING THE OXYGEN CONCENTRATION IN A THREE-WAY CATALYTIC CONVERTER SYSTEM

(75) Inventors: Gerd Rösel, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/084,132

(22) Filed: Feb. 27, 2002

(65) Prior Publication Data

US 2002/0116919 A1 Aug. 29, 2002

(30) Foreign Application Priority Data

Feb. 27, 2001 (DE) .......................... 101 09 331

(51) Int. Cl.[7] ................................ F01N 3/00
(52) U.S. Cl. ...................... 60/285; 60/274; 60/276; 701/109
(58) Field of Search ............ 60/274, 276, 285, 60/286; 701/103, 109

(56) References Cited

U.S. PATENT DOCUMENTS

| 4,251,990 A | * | 2/1981 | Norimatsu et al. | ........... 60/276 |
|---|---|---|---|---|
| 5,233,829 A | * | 8/1993 | Komatsu | ...................... 60/276 |
| 5,271,223 A | * | 12/1993 | Hoshi | ........................... 60/276 |
| 5,758,491 A | * | 6/1998 | Agustin et al. | ............... 60/274 |
| 5,937,638 A | * | 8/1999 | Akazaki et al. | ............... 60/274 |
| 6,021,767 A | * | 12/2000 | Yasui et al. | .................... 60/276 |

* cited by examiner

*Primary Examiner*—Thomas Denion
*Assistant Examiner*—Binh Tran
(74) *Attorney, Agent, or Firm*—Laurence A. Greenberg; Werner H. Stemer; Ralph E. Locher

(57) ABSTRACT

For a three-way catalytic converter system with a preliminary catalytic converter, a main catalytic converter and an oxygen sensor with a constant characteristic curve disposed between the two catalytic converters, a method for resetting the oxygen concentration in the preliminary catalytic converter and the main catalytic converter in the event of a transition from lean-burn operation to stoichiometric operation includes exposing both catalytic converters to a rich mix until the desired oxygen concentrations have been reached. In the process, the constant measurement signal from the oxygen sensor and the measurement signal from an air mass flow meter are used to calculate the quantity of oxygen that is released to the exhaust gas from the main catalytic converter, in order to end rich-burn operation when a predetermined desired value is reached.

10 Claims, 1 Drawing Sheet

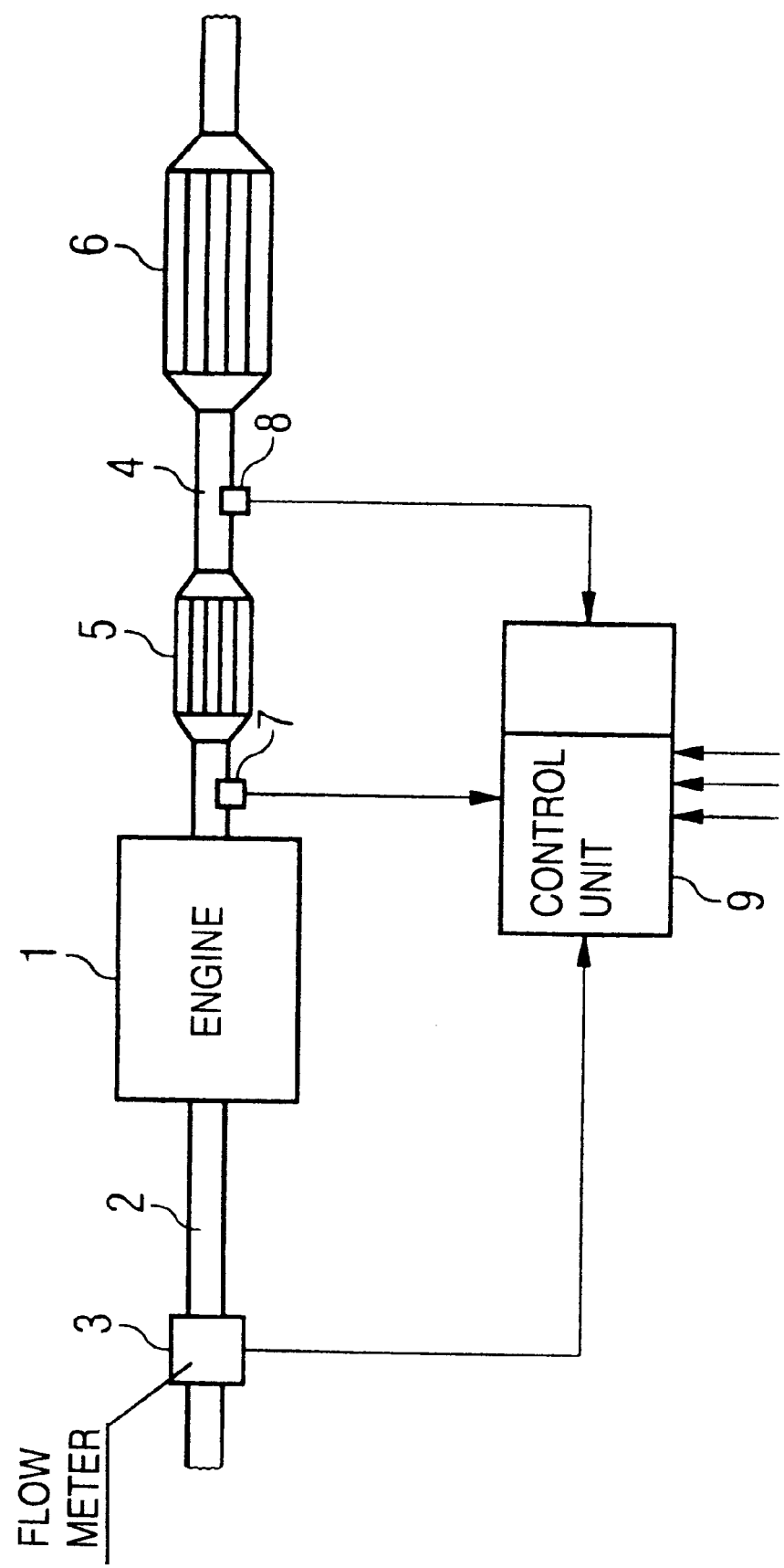

METHOD FOR ADJUSTING THE OXYGEN CONCENTRATION IN A THREE-WAY CATALYTIC CONVERTER SYSTEM

BACKGROUND OF THE INVENTION

Field of the Invention

The invention relates to a method for adjusting the oxygen concentration in a three-way catalytic converter system, which includes a preliminary catalytic converter and a main catalytic converter, in an exhaust train of an internal combustion engine with lambda control.

Three-way catalytic converters are known to have the ability, when the engine is operating with excess oxygen (lean-burn operation), to store oxygen from the exhaust gas, and to release oxygen to the exhaust gas when the engine is operating with insufficient oxygen (rich-burn operation). The relative oxygen concentration in the catalytic converter may vary between extremes of 0% and 100%. However, a three-way catalytic converter only has optimum three-way conversion properties within a middle range of the oxygen concentration, for example, between 30% and 70%.

In the case of internal combustion engines with lambda control, the mean oxygen concentration of the catalytic converter system does not change as long as the internal combustion engine is operated with a stoichiometric mix (lambda=1). In the event of deviations from stoichiometric operation, for example, in the event of lean-burn operation in an overrun cutoff phase, the pollutant concentration in the catalytic converter system rises to values that lie outside the optimum range. When stoichiometric operation is restored, therefore, the oxygen concentration in the catalytic converter system has to be reset.

For such a purpose, after lean-burn operation and before transition to stoichiometric operation, the catalytic converter system is exposed to a rich mix, until a desired oxygen concentration has been produced in the catalytic converter system. In the case of a catalytic converter system with a preliminary catalytic converter and a main catalytic converter, the process may take place such that, after lean-burn operation, the oxygen concentration in both catalytic converters is respectively reduced in a controlled manner by an oxygen probe connected downstream of the corresponding catalytic converter. However, in combination with the oxygen sensor disposed upstream of the preliminary catalytic converter, the control requires a total of three oxygen sensors, which entails a correspondingly high manufacturing and control outlay. If the additional oxygen sensor downstream of the main catalytic converter is dispensed with, hitherto all that has been possible is purely controlled adjustment of the relative oxygen concentration of the main catalytic converter after lean-burn phases, a method that does not achieve any great adjustment accuracy.

SUMMARY OF THE INVENTION

It is accordingly an object of the invention to provide a method for adjusting the oxygen concentration in a three-way catalytic converter system, including a preliminary catalytic converter and a main catalytic converter, in an exhaust train of an internal combustion engine with lambda control, that overcomes the hereinafore-mentioned disadvantages of the heretofore-known devices and methods of this general type and that easily and with the highest possible accuracy allows the three-way conversion properties of the catalytic converter system to be optimized after the transition from operation with a lean or rich fuel/air mix to stoichiometric operation or during permanent stoichiometric operation.

With the foregoing and other objects in view, there is provided, in accordance with the invention, a method for adjusting an oxygen concentration in a catalytic converter system with lambda control for optimizing three-way conversion properties of the catalytic converter system after the transition from lean-burn operation with a lean fuel/air mix to stoichiometric operation or during permanent stoichiometric operation, the method including the steps of providing a catalytic converter system in an exhaust train of an internal combustion engine, the catalytic converter system having a preliminary three-way catalytic converter, a main three-way catalytic converter disposed downstream of the preliminary catalytic converter with respect to an exhaust flow direction, a pre-cat oxygen sensor disposed upstream of the preliminary catalytic converter with respect to an exhaust flow direction and producing a measurement signal, an inter-cat oxygen sensor having a constant characteristic curve, the inter-cat oxygen sensor disposed between the preliminary catalytic converter and the main catalytic converter and producing a measurement signal, an air mass flow meter disposed in an intake section of the internal combustion engine and producing a measurement signal, and an operation control unit receiving measurement signals from the air mass flow meter, the pre-cat oxygen sensor, and the inter-cat oxygen sensor, switching operation to a predetermined rich fuel/air mix following one of a lean-burn operation and a permanent stoichiometric operation, determining a time at which the preliminary catalytic converter has been fully discharged through release of its stored oxygen to the exhaust gas utilizing the measurement signal from the inter-cat oxygen sensor, calculating on an ongoing basis a quantity of oxygen released to the exhaust gas from the main catalytic converter from the determined time onward utilizing the measurement signals from the inter-cat oxygen sensor and the air mass flow meter, and comparing the oxygen quantity with a desired predetermined value corresponding to a desired oxygen concentration in the main catalytic converter, ending operation with the rich air/fuel mix as soon as the quantity of oxygen released to the exhaust gas by the main catalytic converter has reached the desired predetermined value, and switching operation to stoichiometric mode.

With the objects of the invention in view, there is also provided a method for adjusting the oxygen concentration in a catalytic converter system with lambda control for optimizing the three-way conversion properties of the catalytic converter system after the transition from a rich-burn operation with a rich fuel/air mix to stoichiometric operation or during permanent stoichiometric operation, the method including the steps of providing a catalytic converter system in an exhaust train of an internal combustion engine, the catalytic converter system having a preliminary three-way catalytic converter, a main three-way catalytic converter disposed downstream of the preliminary catalytic converter with respect to an exhaust flow direction, a pre-cat oxygen sensor disposed upstream of the preliminary catalytic converter with respect to an exhaust flow direction and producing a measurement signal, an inter-cat oxygen sensor having a constant characteristic curve, the inter-cat oxygen sensor disposed between the preliminary catalytic converter and the main catalytic converter and producing a measurement signal, an air mass flow meter disposed in an intake section of the internal combustion engine and producing a measurement signal, and an operation control unit receiving measurement signals from the air mass flow meter, the pre-cat oxygen sensor, and the inter-cat oxygen sensor, switching operation to a predetermined lean fuel/air mix following one of a rich-burn operation and a permanent stoichiometric operation, determining a time at which the preliminary catalytic converter is fully laden as a result of taking up oxygen from the exhaust gas using the measurement signal from the inter-cat oxygen sensor, calculating on an ongoing basis a quantity of oxygen taken up from the exhaust gas by the main catalytic converter from the determined time onward utilizing the measurement signals from the inter-cat oxygen sensor and the air mass flow meter, and comparing the oxygen quantity with a desired predetermined value corresponding to a desired oxygen concentration in the main catalytic converter, ending the lean-burn operation as soon as the quantity of oxygen taken up from the exhaust gas by the main catalytic converter has reached the desired predetermined value, and switching operation to a stoichiometric fuel/air mix.

The method according to the invention works based upon a sensor system, in which an oxygen sensor is disposed upstream of the preliminary catalytic converter, and a second oxygen sensor is disposed between the two catalytic converters, of which sensors at least the second is an oxygen sensor with a constant characteristic curve (a broadband lambda probe). An oxygen sensor downstream of the main catalytic converter, i.e., a third oxygen sensor, is not required.

In the method according to the invention, following, for example, lean-burn operation, operation is switched to a rich-burn mode, to expose firstly the preliminary catalytic converter and then the main catalytic converter to a rich mix. In the process, the measurement signal from the inter-cat oxygen sensor is used to establish the time at which the preliminary catalytic converter has been completely discharged by releasing its stored oxygen to the exhaust gas. Then, according to the invention, the quantity of oxygen that is released to the exhaust gas by the main catalytic converter from this time is calculated on an ongoing basis, using the continuous measurement signal from the inter-cat oxygen sensor and the measurement signal from an air mass flow meter disposed in the intake section of the internal combustion engine, and is compared with a desired value, which is to be predetermined, corresponding to a required oxygen concentration in the main catalytic converter. When such a desired value has been reached, operation with a rich mix is ended.

Because the measurement signals from an inter-cat oxygen sensor and the air mass flow meter allow the reduction in the oxygen concentration in the main catalytic converter during rich-burn operation to be calculated, there is no need for a further oxygen sensor downstream of the main catalytic converter. Nevertheless, the method according to the invention allows a relatively high adjustment accuracy to be achieved.

After rich-burn operation has ended, and before stoichiometric operation is commenced, a brief lean-burn operating phase can take place, until the oxygen concentration of the preliminary catalytic converter has reached a desired level. The oxygen concentrations of the two catalytic converters would then in each case lie within a range in which they have optimum three-way conversion properties.

The method according to the invention for calculating the oxygen concentration in the main catalytic converter can be applied in a similar manner to permanent stoichiometric operation and to the transition from rich-burn operation to stoichiometric operation.

In accordance with another mode of the invention, after the rich operation has ended and before stoichiometric operation commences, including the step of operating with a lean fuel/air mix for a given time period until an oxygen concentration of the preliminary catalytic converter reaches a predetermined value.

In accordance with a further mode of the invention, a desired predetermined value for a quantity of oxygen to be released by the main catalytic converter is determined based upon a characteristic diagram as a function of an air mass flow rate, a temperature, and further characteristic variables of the main catalytic converter.

In accordance with an added mode of the invention, characteristic values are formed from a diagnosis of the preliminary catalytic converter and a demand for rich fuel/air mix to reach a desired oxygen concentration in the preliminary catalytic converter, and the characteristic values are taken into account when determining the desired predetermined value for the quantity of oxygen to be released by the main catalytic converter.

In accordance with an additional mode of the invention, after the lean operation has ended and before stoichiometric operation commences, including the step of operating with a rich fuel/air mix for a given time period until an oxygen concentration of the preliminary catalytic converter reaches a predetermined value.

In accordance with yet another mode of the invention, a desired predetermined value for a quantity of oxygen to be taken up by the main catalytic converter based upon a characteristic diagram is determined as a function of an air mass flow rate, a temperature, and further characteristic variables of the main catalytic converter.

In accordance with a concomitant mode of the invention, characteristic values are formed from a diagnosis of the preliminary catalytic converter and a demand for lean fuel/air mix to reach a desired oxygen concentration in the preliminary catalytic converter, and the characteristic values are taken into account when determining the desired predetermined value for the quantity of oxygen to be taken up by the main catalytic converter.

Other features that are considered as characteristic for the invention are set forth in the appended claims.

Although the invention is illustrated and described herein as embodied in a method for adjusting the oxygen concentration in a three-way catalytic converter system, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawing.

BRIEF DESCRIPTION OF THE DRAWING

The FIGURE is a block circuit diagram illustrating a catalytic converter system of an internal combustion engine according to the invention.

DESCRIPTION OF THE PREFERRED EMBODIMENTS

Referring now to the single FIGURE of the drawing, it is seen that an internal combustion engine 1 has an intake section 2, in which an air mass flow meter 3 is disposed, and an exhaust section 4, in which a preliminary catalytic converter 5 is disposed close to the internal combustion engine 1, in terms of flow, and a main catalytic converter 6 is disposed downstream of the preliminary catalytic converter 5. Both catalytic converters are configured as three-way catalytic converters. Upstream of the preliminary catalytic converter 5, the exhaust section 4 includes a pre-cat oxygen sensor 7, and between the two catalytic converters 5, 6, the exhaust section 4 includes an inter-cat oxygen sensor 8. Both oxygen sensors are configured as sensors with a constant characteristic curve (i.e., as broadband lambda probes), although the pre-cat oxygen sensor 7 could also be configured as a sensor with a two-point characteristic.

The measurement signals from the air mass flow meter 3 and the oxygen sensors 7, 8 are fed, together with further measurement signals, to an operation control unit 9, which controls operation of the internal combustion engine 1 as a function of these measurement signals. The operation control unit 9 includes a conventional lambda control to supply the internal combustion engine 1 with a stoichiometric fuel/air mix (lambda=1) under standard operating conditions.

If a deviation from stoichiometric operation, for example, operation with a lean fuel/air mix (lambda>1), occurs during operation of the internal combustion engine, the excess oxygen contained in the exhaust gas is stored in the catalytic converters 5, 6 until their relative oxygen concentration reaches 100%. Therefore, on transition from lean-burn operation to stoichiometric operation, the oxygen concentration of the catalytic converters 5, 6 has to be reset to a middle value, for example, between 30 and 70%, so that the catalytic converters 5, 6 have optimum three-way conversion properties in the event of stoichiometric operation.

For such a purpose, after the lean-burn operation, first, an operating phase with a predetermined rich fuel/air mix takes place to reduce the oxygen concentration in the catalytic converters 5, 6 through oxidation of the oxygen stored in the catalytic converters with corresponding components (HC, CO) of the exhaust gas. In the process, first, the measurement signal from the inter-cat oxygen sensor 8 is used to determine the time at which the preliminary catalytic converter 5 has released all its stored oxygen to the exhaust gas. The time of complete discharge of the preliminary catalytic converter 5 is reached when the inter-cat oxygen sensor 8 detects a rich mix.

The reduction of the oxygen concentration in the main catalytic converter 6 then begins. The quantity of oxygen that is released from the main catalytic converter 6 to the exhaust gas from this time can then be calculated with the aid of the constant measurement signal from the inter-cat oxygen sensor 8 and the measurement signal from the air mass flow meter 3. The oxygen mass flow rate can be calculated as $21\% \; (1-1/\lambda) \times$ air mass flow rate. Integration gives the quantity of oxygen. The level of the continuously increasing quantity of oxygen is compared in the operation control unit 9 with a desired value that is to be predetermined according to a desired oxygen concentration of the main catalytic converter 6. When the calculated oxygen quantity reaches the desired value, i.e., when the main catalytic converter 6 has released a predetermined quantity of oxygen, operation with a rich mix is ended.

The desired value for the quantity of oxygen to be released by the main catalytic converter 6 is predetermined by the operation control unit 9 from a characteristic diagram, as a function of air mass flow rate, the temperature, and further characteristic variables of the main catalytic converter 6.

As such, a desired oxygen concentration of the main catalytic converter 6 can be adjusted with a relatively high level of accuracy. It is then possible to switch over to stoichiometric operation.

Because, in the method, the preliminary catalytic converter 5 has been completely discharged with regard to its oxygen concentration, the preliminary catalytic converter 5 could briefly be exposed to a lean mix again, in order for a desired oxygen concentration also to be set in the preliminary catalytic converter 5 before switching over to stoichiometric operation.

To increase the robustness of the method described and, in particular, to take account of aging phenomena of the catalytic converters when stipulating the desired value for the quantity of oxygen to be released by the main catalytic converter 6, characteristic values, which are taken into account when determining the desired value for the quantity of oxygen to be released by the main catalytic converter, can be formed from a diagnosis of the preliminary catalytic converter 5 and the demand for rich mix to set a desired oxygen concentration in the preliminary catalytic converter.

It should be emphasized once again that the method described could make do without an oxygen sensor downstream of the main catalytic converter 6. It will be understood that the method described, in the case of an internal combustion engine with a plurality of banks and a corresponding number of exhaust sections with preliminary and main catalytic converters, has to be carried out separately for each bank.

The method described for calculating the oxygen concentration in the main catalytic converter can also be applied, in a similar way, to permanent stoichiometric operation and to the transition from rich engine operation to stoichiometric operation.

We claim:

1. A method for adjusting an oxygen concentration in a catalytic converter system with lambda control for optimizing three-way conversion properties of the catalytic converter system after the transition from lean-burn operation with a lean fuel/air mix to stoichiometric operation or during permanent stoichiometric operation, the method which comprises:

providing a catalytic converter system in an exhaust train of an internal combustion engine, the catalytic converter system having:
a preliminary three-way catalytic converter;
a main three-way catalytic converter disposed downstream of the preliminary catalytic converter with respect to an exhaust flow direction;
a pre-cat oxygen sensor disposed upstream of the preliminary catalytic converter with respect to an exhaust flow direction and producing a measurement signal;
an inter-cat oxygen sensor having a constant characteristic curve, the inter-cat oxygen sensor disposed between the preliminary catalytic converter and the main catalytic converter and producing a measurement signal;
an air mass flow meter disposed in an intake section of the internal combustion engine and producing a measurement signal; and
an operation control unit receiving measurement signals from the air mass flow meter, the pre-cat oxygen sensor, and the inter-cat oxygen sensor;

switching operation to a predetermined rich fuel/air mix following one of a lean-burn operation and a permanent stoichiometric operation;

determining a time at which the preliminary catalytic converter has been fully discharged through release of its stored oxygen to the exhaust gas utilizing the measurement signal from the inter-cat oxygen sensor;

calculating on an ongoing basis a quantity of oxygen released to the exhaust gas from the main catalytic converter from the determined time onward utilizing the measurement signals from the inter-cat oxygen sensor and the air mass flow meter, and comparing the oxygen quantity with a desired predetermined value corresponding to a desired oxygen concentration in the main catalytic converter;

ending operation with the rich air/fuel mix as soon as the quantity of oxygen released to the exhaust gas by the main catalytic converter has reached the desired predetermined value; and switching operation to stoichiometric mode.

2. The method according to claim 1, which further comprises, after the rich operation has ended and before stoichiometric operation commences, operating with a lean fuel/air mix for a given time period until an oxygen concentration of the preliminary catalytic converter reaches a predetermined value.

3. The method according to claim 1, which further comprises determining a desired predetermined value for a quantity of oxygen to be released by the main catalytic converter based upon a characteristic diagram as a function of an air mass flow rate, a temperature, and further characteristic variables of the main catalytic converter.

4. The method according to claim 1, which further comprises:

forming characteristic values from a diagnosis of the preliminary catalytic converter and a demand for rich fuel/air mix to reach a desired oxygen concentration in the preliminary catalytic converter; and taking the characteristic values into account when determining the desired predetermined value for the quantity of oxygen to be released by the main catalytic converter.

5. The method according to claim 3, which further comprises:

forming characteristic values from a diagnosis of the preliminary catalytic converter and a demand for rich fuel/air mix to reach a desired oxygen concentration in the preliminary catalytic converter; and taking the characteristic values into account when determining the desired predetermined value for the quantity of oxygen to be released by the main catalytic converter.

6. A method for adjusting the oxygen concentration in a catalytic converter system with lambda control for optimizing the three-way conversion properties of the catalytic converter system after the transition from a rich-burn operation with a rich fuel/air mix to stoichiometric operation or during permanent stoichiometric operation, which further comprises:

providing a catalytic converter system in an exhaust train of an internal combustion engine, the catalytic converter system having:
 a preliminary three-way catalytic converter;
 a main three-way catalytic converter disposed downstream of the preliminary catalytic converter with respect to an exhaust flow direction;
 a pre-cat oxygen sensor disposed upstream of the preliminary catalytic converter with respect to an exhaust flow direction and producing a measurement signal;
 an inter-cat oxygen sensor having a constant characteristic curve, the inter-cat oxygen sensor disposed between the preliminary catalytic converter and the main catalytic converter and producing a measurement signal;
 an air mass flow meter disposed in an intake section of the internal combustion engine and producing a measurement signal; and
 an operation control unit receiving measurement signals from the air mass flow meter, the pre-cat oxygen sensor, and the inter-cat oxygen sensor;

switching operation to a predetermined lean fuel/air mix following one of a rich-burn operation and a permanent stoichiometric operation;

determining a time at which the preliminary catalytic converter is fully laden as a result of taking up oxygen from the exhaust gas using the measurement signal from the inter-cat oxygen sensor;

calculating on an ongoing basis a quantity of oxygen taken up from the exhaust gas by the main catalytic converter from the determined time onward utilizing the measurement signals from the inter-cat oxygen sensor and the air mass flow meter, and comparing the oxygen quantity with a desired predetermined value corresponding to a desired oxygen concentration in the main catalytic converter;

ending the lean-burn operation as soon as the quantity of oxygen taken up from the exhaust gas by the main catalytic converter has reached the desired predetermined value; and switching operation to a stoichiometric fuel/air mix.

7. The method according to claim 6, which further comprises, after the lean operation has ended and before stoichiometric operation commences, operating with a rich fuel/air mix for a given time period until an oxygen concentration of the preliminary catalytic converter reaches a predetermined value.

8. The method according to claim 6, which further comprises determining a desired predetermined value for a quantity of oxygen to be taken up by the main catalytic converter based upon a characteristic diagram as a function of an air mass flow rate, a temperature, and further characteristic variables of the main catalytic converter.

9. The method according to claim 6, which further comprises:

forming characteristic values from a diagnosis of the preliminary catalytic converter and a demand for lean fuel/air mix to reach a desired oxygen concentration in the preliminary catalytic converter; and taking the characteristic values into account when determining the desired predetermined value for the quantity of oxygen to be taken up by the main catalytic converter.

10. The method according to claim 8, which further comprises:

forming characteristic values from a diagnosis of the preliminary catalytic converter and a demand for lean fuel/air mix to reach a desired oxygen concentration in the preliminary catalytic converter; and taking the characteristic values into account when determining the desired predetermined value for the quantity of oxygen to be taken up by the main catalytic converter.

* * * * *